(12) United States Patent
Wallerstein et al.

(10) Patent No.: US 6,597,520 B2
(45) Date of Patent: Jul. 22, 2003

(54) PANORAMIC IMAGING ARRANGEMENT

(75) Inventors: Edward P. Wallerstein, Pleasanton, CA (US); Edward C. Driscoll, Jr., Portola Valley, CA (US); John L. W. Furlan, Belmont, CA (US)

(73) Assignee: Be Here Corporation, Fremont, CA (US)

( * ) Notice: Subject to any disclaimer, the term of this patent is extended or adjusted under 35 U.S.C. 154(b) by 0 days.

(21) Appl. No.: 10/119,106

(22) Filed: Apr. 9, 2002

(65) Prior Publication Data
US 2002/0154417 A1 Oct. 24, 2002

Related U.S. Application Data

(63) Continuation-in-part of application No. 09/837,750, filed on Apr. 17, 2001, which is a continuation of application No. 09/629,034, filed on Jul. 31, 2001, now Pat. No. 6,222,683, which is a continuation of application No. 09/229,807, filed on Jan. 13, 1999, now Pat. No. 6,175,454.

(60) Provisional application No. 60/360,138, filed on Feb. 26, 2002, and provisional application No. 60/360,748, filed on Mar. 1, 2002.

(51) Int. Cl.[7] ......................... G02B 13/06; G02B 17/00
(52) U.S. Cl. ......................... 359/725; 359/726
(58) Field of Search ........................ 359/725, 726, 359/727, 730, 731

(56) References Cited

U.S. PATENT DOCUMENTS 6,175,454 B1 * 1/2001 Hoogland et al. .......... 359/725
6,222,683 B1 * 4/2001 Hoogland et al. .......... 359/725

* cited by examiner

Primary Examiner—Hung Xuan Dang
Assistant Examiner—Mohammad Abutayeh
(74) Attorney, Agent, or Firm—Daniel B. Curtis

(57) ABSTRACT

According to one aspect of the invention there is provided a panoramic imaging arrangement comprising a first and second transparent component both rotationally symmetric about an axis of revolution. The first transparent component has an upper surface and a lower surface. The lower surface includes a reflective portion and a refractive portion both about the axis of revolution. The refractive portion extends radially from the axis of revolution to the start of the reflective portion. The second transparent component is attached to the first transparent component at a refractive interface that extends into the upper surface. The second transparent component includes a distal reflective surface. Light from a portion of a surrounding panoramic scene is refracted by a portion of the upper surface, is reflected by the reflective portion of the lower surface through the refractive interface to the distal reflective surface. Once reflected from the distal reflective surface, the light again passes through the refractive interface and exits the first transparent component through the refractive portion of the lower surface.

40 Claims, 3 Drawing Sheets

PANORAMIC IMAGING ARRANGEMENT

This application is a continuation-in-part from copending U.S. patent application Ser. No. 09/837,750 filed on Apr. 17, 2001. This application also claims priority to provisional application No. 60/360,138 filed on Feb. 26, 2002 with attorney docket number P011XP having the title Panoramic Imaging Arrangement and with the same inventors. This application also claims priority to provisional application No.60/360,748 filed on Mar. 1, 2002 with attorney docket number P011XP2 having the title Panoramic Imaging Arrangement and with the same inventors.

BACKGROUND OF THE INVENTION

1. Field of the Invention

This invention relates to a panoramic imaging arrangement of the kind capable of capturing, focusing, correcting aberrations and otherwise manipulating colored light received from a part of or all of a 360° surrounding panoramic scene.

2. Discussion of Related Art

Paroramic imaging arrangements have become popular in recent years for purposes of viewing 360° surrounding panoramic scenes. Older generations of panoramic imaging arrangements generally consisted of revolving periscope-like constructions having relatively complex mechanisms for revolving them. More recently, stationary panoramic imaging arrangements have been developed. A stationary panoramic imaging arrangement generally has one or more lenses, each having a vertical axis of revolution, which are used to refract or reflect light received from a 360° surrounding panoramic scene. The lenses alter the direction of the light, after which the light passes through a series of lenses which are located vertically one above the other and which further manipulate the light by, for example, focusing the light or altering the intensity of the light.

The task of receiving light in a sideways direction and altering the direction of the light so that the light then proceeds in a vertical direction is a difficult one. Altering the direction of light to such a degree, especially when coming from a 360° surrounding scene, often leads to aberrations in the resulting light. These aberrations may include astigmatism of the light, defects in color of the light, a loss of image plane flatness, and other defects, some of which are subsequently discussed in more detail.

Relatively complex lenses and lens arrangements have been developed in order to overcome these aberrations and produce an acceptable image. These lens arrangements usually include a large number of lenses and oftentimes have lenses with surfaces that are aspherical (see for example U.S. Pat. No. 5,473,474 issued to Powell). Aspherical lenses are difficult to manufacture and therefore are less practical to manufacture than for example spherical lenses.

Because of the astigmatism induced by steep surfaces, well corrected prior art panoramic optical systems (those that have angles substantially above and below the horizon) have some lenses/mirrors that are considerably larger than the image size. Thus, these optical systems are large and have a maximum clear aperture (largest required lens/mirror diameter) of more than 10× the image diameter.

In addition, lenses that include voids (air spaces) can be more difficult to manufacture than solid lenses because of the difficulty in aligning the parts of the lens system.

It would be advantageous to have a panoramic imaging arrangement that is solid, is color corrected, has a maximum clear aperture (largest required lens/mirror diameter) of less than 8× the image diameter, and has an increased aperture (of the order of F4.6 as compared to F20).

SUMMARY OF THE INVENTION

According to one aspect of the invention there is provided a panoramic imaging arrangement comprising a first and second transparent component both rotationally symmetric about an axis of revolution. The first transparent component has an upper surface and a lower surface. The lower surface includes a reflective portion and a refractive portion both about the axis of revolution. The refractive portion extends radially from the axis of revolution to the start of the reflective portion. The second transparent component is attached to the first transparent component at a refractive interface that extends into the upper surface. The second transparent component includes a distal reflective surface.

Light from a portion of a surrounding panoramic scene is refracted by a portion of the upper surface, is reflected by the reflective portion of the lower surface through the refractive interface to the distal reflective surface. Once reflected from the distal reflective surface, the light again passes through the refractive interface and exits the first transparent component through the refractive portion of the lower surface.

Another aspect of the invention is a partial panoramic imaging arrangement that includes a first transparent component about an axis of revolution. The first transparent component has an upper surface and a lower surface. The lower surface includes a first reflective portion and a refractive portion both of these portions about the axis of revolution. The refractive portion is radially inward from said first reflective portion. Light from a greater than 90° surrounding partial panoramic scene, is refracted by a portion of said upper surface. The partial panoramic imaging arrangement also includes a second transparent component attached to the first transparent component at a refractive interface. The refractive interface, also about the axis of revolution and extending into the upper surface. The second transparent component also includes a distal reflective surface.

The foregoing and many other aspects of the present invention will no doubt become obvious to those of ordinary skill in the art after having read the following detailed description of the preferred embodiments that are illustrated in the various drawing figures.

DETAILED DESCRIPTION OF THE INVENTION

Figure 1:
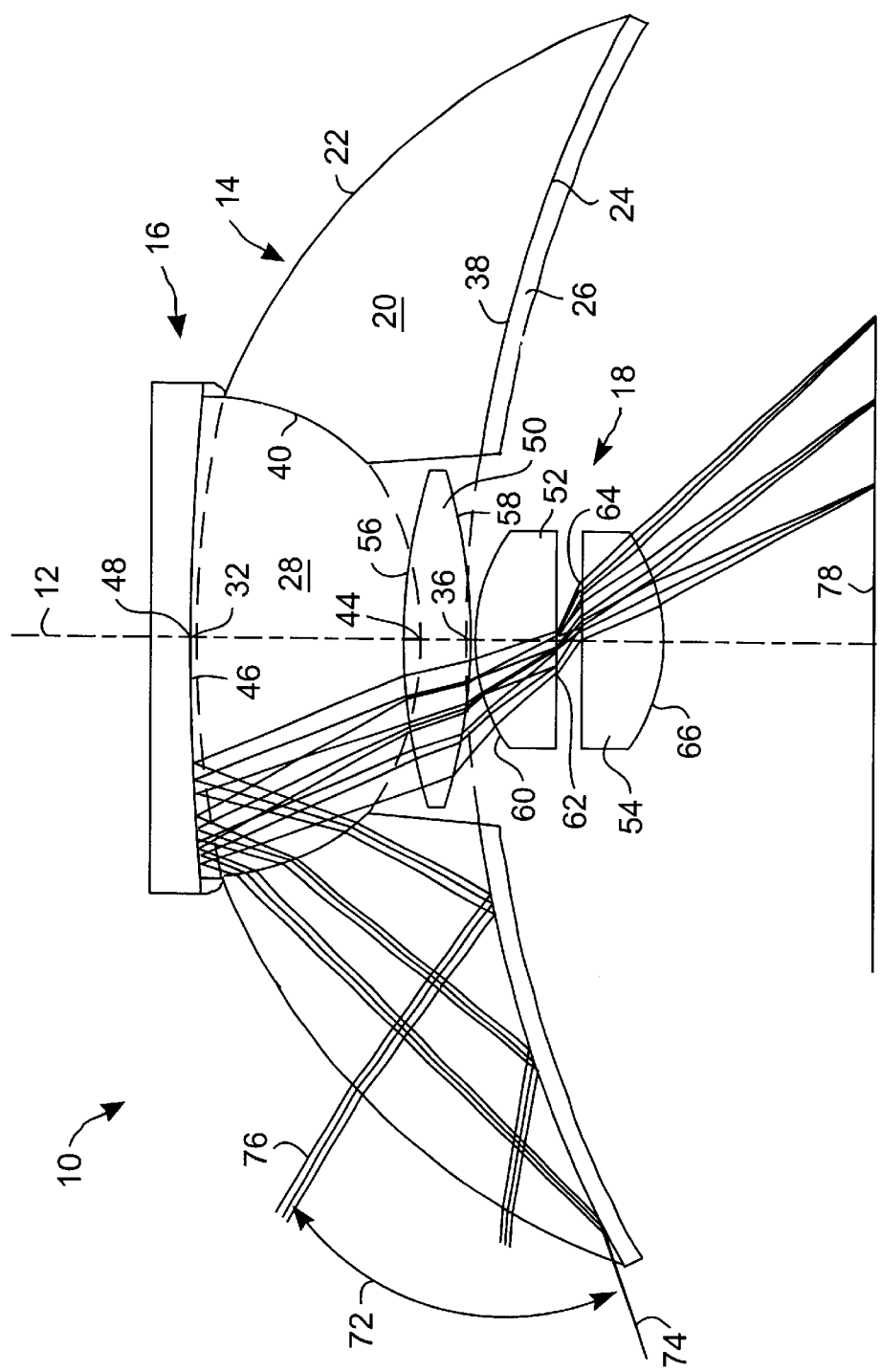
FIG. 1 is a sectioned side view of a panoramic imaging arrangement, according to an embodiment of the invention, in a plane of a vertical axis of revolution thereof.

FIG. 1 of the accompanying drawings illustrates a panoramic imaging arrangement 10, according to an embodiment of the invention, in a plane of a vertical axis of revolution 12 thereof. The panoramic imaging arrangement 10 includes a lens block 14, a mirror 16, and a system of lenses 18.

The lens block 14 includes a transparent component 20 having a first, upper, convex surface 22 symmetrically about the axis of revolution 12 and a second, lower, concave surface 24 also symmetrically about the axis of revolution 12. A reflective material 26 is formed on the lower, concave surface 24. A hole 28 is formed vertically through the transparent component 20.

The upper, convex surface 22 of the transparent component 20 is spherical and has a radius of about 21.310 mm. An extension of the upper, convex surface 22 intersects the axis of revolution 12 and a first location 32.

The lower, concave surface 24 of the transparent component 20 is spherical and has a radius of about 40.200 mm. Extensions of the upper, convex surface 22 and of the lower, concave surface 24 intersect one another due to the larger radius of the lower, convex surface 24 with respect to the radius of the upper, convex surface 22. An extension of the lower, concave surface 24 intersects the axis of revolution 12 and a second location 36 which is located about 9 mm below the first location 32 where the extension of the upper, convex surface 22 intersects the axis of revolution 12.

By forming the reflective material 26 on the lower, concave surface 24, the reflective material 26 provides a convex reflective surface 38 against the lower, concave surface 24 and conforming in shape thereto.

An upper portion of the hole 28 is formed by an opening defining a third, internal surface 40 of the transparent component 20 The internal surface 40 is located symmetrically about the axis of revolution 12. The internal surface 40 is spherical and has a concave profile with a radius of about 7.650 mm. An extension of the internal surface 40 intersects the axis of revolution 12 at a third location 44 which is located about 0.5 mm above the second location 36 where the extension of the lower, concave surface 24 (and therefore also of the reflective surface 38) intersects the axis of revolution 12.

The mirror 16 is secured to the transparent component 20 at a location over the hole 28. The mirror 16 has a concave reflective area 46 that is spherical and is located symmetrically about the axis of revolution 12. The reflective area 46 has a radius of about 87.750 mm and intersects to the axis of revolution 12 at a fourth location 48 which is located about 8.115 mm above the third location 44 where an extension of the internal surface 40 intersects the axis of revolution 12.

The system of lenses includes a first, upper lens 50 located within a lower portion of the hole 28, a second, intermediate lens 52 located below the upper lens 50, and a third, lower lens 54 located below the intermediate lens 52. The upper lens 50 has a convex upper surface 56 with a radius of about 18.000 mm and a lower surface with a radius of about 20.475 mm. The intermediate lens 52 has an upper, convex surface 60 with a radius of about 6.060 mm and a lower, concave surface 62 with a radius of about 4.700 mm. The lower lens 54 has an upper, concave surface 64 with a radius of about 10.550 mm and a lower, convex surface 66 with a radius of about 5.325 mm. Other features of the upper, intermediate and lower lenses 50, 52 and 54 are not discussed further in detail herein as these features would be evident to one of ordinary skill in the art.

In use, the light from a 360° surrounding panoramic scene enters the transparent component 20 through the upper, convex surface 22. Light is received from the surrounding panoramic scene for an unbroken included angle 72, in a vertical plane of the axis of revolution 12, extending from an angle 74 which is located about 30° below the horizon to an angle 76 which is located about 30° above the horizon. By extending the upper, convex lens 22 or altering its shape, the angle 76 below the horizon may be increased. When the light enters the transparent component 20, the light is refracted slightly downwardly by the upper, convex surface 22, thus reducing the angle of the light with respect to vertical. The light then passes through the transparent component 20 and is then reflected upwardly by the reflective surface 38. Due to be convex shape of the reflective surface 38, the angle of the light with respect to vertical is further reduced after reflection from the reflective surface 38. The light then passes through the transparent component 20 and exits the transparent component through the internal surface 40 Due to the concave shape of the internal surface 40, the light is refracted slightly upwardly when exiting the transparent component 20 through the internal surface 40, thus further reducing the angle of the light with respect to vertical.

After leaving the transparent component, the light passes upwardly through the hole 28 and is reflected downwardly by the reflective area 46 of the mirror 16. The light then passes downwardly through the hole 28 and is refracted respectively by the upper lens 50, the intermediate lens 52, and the lower lens 54. The light, after leaving the lower lens 54, is focused by creating a flat image on a flat focal plane 78.

It can be seen from the previous description that a simple, compact arrangement is provided which is capable of capturing a view of a 360° surrounding panoramic scene. In particular, the panoramic imaging arrangement 10 includes only five components namely the lens block 14, the mirror 16 and the upper, intermediate and lower lenses 50, 52 and 54. Moreover, all the surfaces of the panoramic imaging arrangement 10 which manipulate light are spherical or substantially spherical so as to be easily manufacturable.

A final image is created which is corrected for image flatness and astigmatism. It could be noted that no particular surface or surfaces correct for image flatness and astigmatism, but rather that the sizes, positioning and orientations of all the surfaces cooperate to produce a final image which is corrected for image flatness and astigmatism. It has been found that the panoramic imaging arrangement 10 is particularly suitable for creating a monochromatic image of the surrounding panoramic scene. One of ordinary skill in the art would appreciate that the panoramic imaging arrangement 10 may be modified or may be complemented by additional lenses that would make it more suitable for capturing color images of a surrounding panoramic scene.

Figure 2:
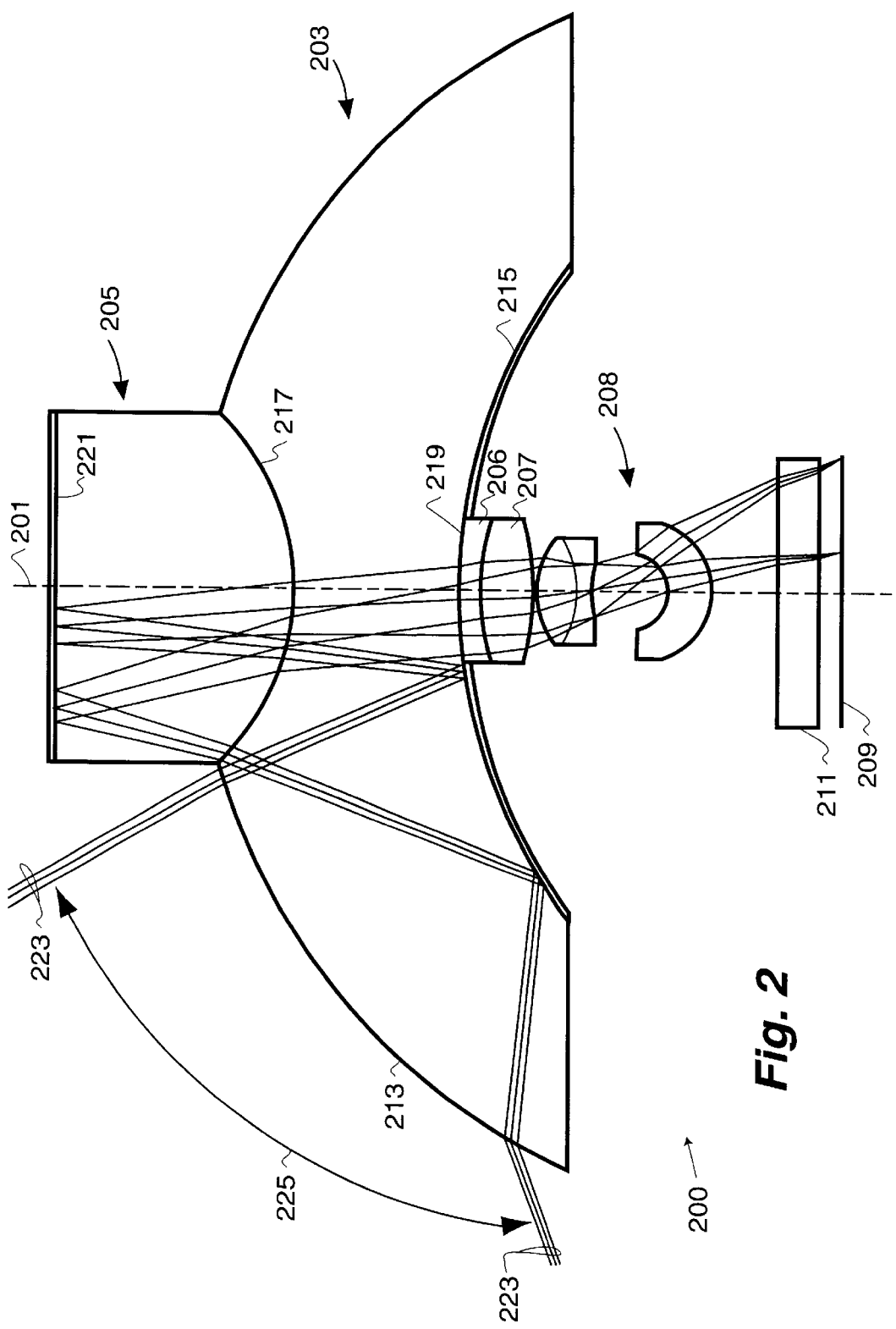
FIG. 2 is a sectioned side view of a color corrected panoramic imaging arrangement using glass components, according to an embodiment of the invention, in a plan of a vertical axis of revolution thereof.

FIG. 2 illustrates a first color corrected panoramic imaging arrangement 200, according to one embodiment of the invention, presented around a vertical axis of revolution 201. In this embodiment, the first color corrected panoramic imaging arrangement 200 includes a first transparent component 203 (a catadioptric lens), a second transparent component 205 (also a catadioptric lens), a third transparent component 206 (a simple lens), a fourth transparent component 207 (also a simple lens), a system of lenses 208, an image sensor 209, and a cover plate 211. The image sensor 209 and the cover plate 211 can be part of an integrated circuit that, in one preferred embodiment, has an imaging area of about ⅔ of an inch. One embodiment of the first color corrected panoramic imaging arrangement 200 is specified by Table 1. All the optical surfaces of the first transparent component 203, the second transparent component 205, the third transparent component 206, and the fourth transparent component 207 are substantially spherical. In this embodiment, the transparent components are glass.

One skilled in the art will understand that the references to vertical, upper and lower are for simplicity in writing the description and that the lens can be used in any orientation.

The first transparent component 203 has an upper refractive convex surface 213, a lower reflective convex surface 215, and a refractive interface 217 each symmetrically rotated about the vertical axis of revolution 201. The lower reflective convex surface 215 has the same curvature as, and extends inward to a lower refractive convex surface 219. One skilled in the art will understand that the lower portion of the first transparent component 203 can be formed to have a lower curvature, and that the outer portion of the lower curved surface can support a reflective material placed on the curved surface leaving a refractive portion of the lower surface symmetric around the vertical axis of revolution 201 through which light can pass.

The second transparent component 205 fits within the depression formed by the refractive interface 217 of the first transparent component 203 and can be glued thereto.

The second transparent component 205 has an upper reflective surface 221 distal from the refractive interface 217 that depending on the embodiment can be concave, flat or convex.

The second transparent component 205 has a significantly lower index of refraction than the first transparent component 203. By using the second transparent component 205 to support the upper reflective surface 221 instead of requiring a separate mirror to be mounted on the lens block (such as mirror 16), the manufacturing process for making the first color corrected panoramic imaging arrangement 200 is simplified over the process used to make the panoramic imaging arrangement 10.

The third transparent component 206 can be glued to the first transparent component 203 at the lower refractive convex surface 219 while the fourth transparent component 207 can be glued to the third transparent component 206. Subsequently described embodiments eliminate the third transparent component 206.

The system of lenses 208 can be supported using an optical tube.

The described implementation of the first color corrected panoramic imaging arrangement 200 is designed to be placed on an image sensor device such an integrated circuit package having the cover plate 211 made from BK7 glass and where the image sensor 209 is about ⅔ of an inch. Light from a surrounding panorama can be focused as an annular image (or partial annular image) on the image sensor 209. One skilled in the art would understand from the previous description and Tables 1–4 how to modify the arrangement for other integrated circuits, and for use with digital still or video cameras. Further, although one preferred embodiment described herein is for a miniature lens, the design can be significantly enlarged. Table 2 provides parameters for a second preferred embodiment that is designed for the image sensor 209 being about ½ inch.

In operation, light 223 enters the first color corrected panoramic imaging arrangement 200 from the surrounding panorama at the upper refractive convex surface 213 of the first transparent component 203 where it is refracted and directed to the lower reflective convex surface 215. The light 223 is reflected towards the refractive interface 217 where it is refracted as it enters the second transparent component 205. Once in the second transparent component 205, the light 223 is reflected by the upper reflective surface 221 back towards the first transparent component 203 again being refracted at the refractive interface 217 (but this surface is now treated as a refractive concave surface). The light 223 then exits the first transparent component 203 at the lower refractive convex surface 219, passes through the third transparent component 206, the fourth transparent component 207, the system of lenses 208 and the cover plate 211 and is captured by the image sensor 209.

This embodiment of the first color corrected panoramic imaging arrangement 200 has a field-of-view 225 of approximately 80° (from 20° below the horizon line to 60° above the horizon line).

Another embodiment of the first color corrected panoramic imaging arrangement 200 is parameterized in Table 2. This embodiment is designed to be used where the image sensor 209 size is about ½ inch.

Figure 3:
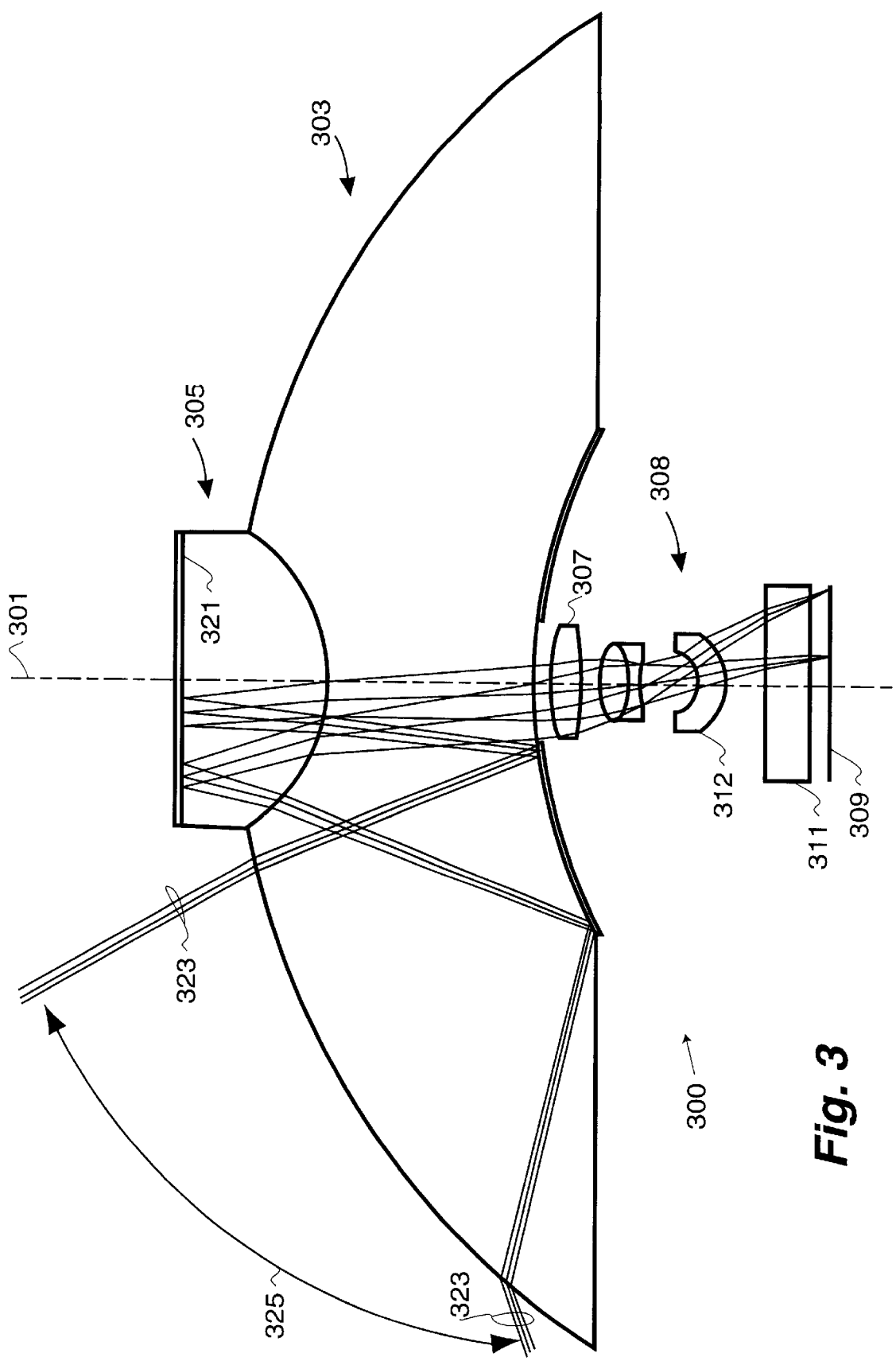
FIG. 3 is a sectioned side view of a color corrected panoramic imaging arrangement using a selection of glass and plastic components, according to an embodiment of the invention, in a plan of a vertical axis of revolution thereof.

FIG. 3 illustrates a second color corrected panoramic imaging arrangement 300 presented around a vertical axis of revolution 301 where the transparent components are a mixture of glass and plastic components. In this embodiment, the second color corrected panoramic imaging arrangement 300 includes a first transparent component 303 (a catadioptric lens), a second transparent component 305 (also a catadioptric lens), a third transparent component 307 (also a simple lens), a system of lenses 308, an image sensor 309, and a cover plate 311. The image sensor 309 and the cover plate 311 can be part of an integrated circuit that, in one preferred embodiment, has an imaging area of about ½ of an inch. One embodiment of the second color corrected panoramic imaging arrangement 300 is specified by Table 3. All the optical surfaces of the first transparent component 303, the second transparent component 305, and the third transparent component 307 are substantially spherical. The system of lenses 308 includes a lens 312. In one preferred embodiment, the second transparent component 305 and the lens 312 are acrylic instead of class. In addition, the third transparent component 307 is polystyrene instead of glass. As in the previously described embodiment, the second transparent component 305 includes an upper reflective surface 321 that is slightly convex.

This embodiment of the second color corrected panoramic imaging arrangement 300 has a field-of-view 325 of approximately 80° (from 20° below the horizon line to 60° above the horizon line).

This embodiment is also less complex as one of the lenses in the embodiment illustrated in FIG. 2 has been replaced by an air-spaced singlet. This can also be done with the embodiment shown in FIG. 2 with compensating changes to the other components.

The second color corrected panoramic imaging arrangement 300 is less difficult to manufacture because some of the lenses can be made using well known plastic molding techniques. In addition, the use of plastic molding techniques simplifies the alignment of the lenses in the optical tube.

The second color corrected panoramic imaging arrangement 300 operates in essentially the same manner as the first color corrected panoramic imaging arrangement 200 where the air-spaced singlet replaces the third transparent component 206. One skilled in the art would understand the operation of the arrangement after reading the operational description previously provided in view of the provided figures.

Yet another embodiment of the invention is described by Table 4. This embodiment has the same fundamental arrangement of components as the second color corrected panoramic imaging arrangement 300, except that the first transparent component 303 is now made of polystyrene instead of glass. In addition, the upper reflective surface 321 is concave instead of convex. The other components are adjusted as indicated in Table 4. In addition, this embodiment has a field-of-view 325 of approximately 86° (from 20° below the horizon line to and 66° above the horizon line).

This arrangement of two reflections in combination with various refracting surfaces lends itself to miniaturization. This is important for certain applications such as helmet mounting and covert security systems. Depending on the chosen vertical field of view, numerical aperture, required degree of correction, manufacturing cost goals, choice of materials, etc., the maximum clear aperture (largest required lens/mirror diameter) of this type of system can be as small as about 2× the image diameter containing the chosen vertical field of view. In the preferred embodiments herein, this ratio ranges from about 2× to 6× the image diameter.

One skilled in the art will understand that many different materials and configurations can be used to practice the invention extending from all glass components to all plastic components and with a wide variety of sizes of the lens and image sensors.

One skilled in the art will understand that some embodiments of the invention are small enough to be used with a visual and/or video conferencing device that can be placed in the middle of a conference table much like existing audio conferencing devices. A visual conferencing device is one that is similar to a video conferencing device, but need not transmit video signals (such as would be received by a television) and instead transmits a stream of frames that can be displayed by a computer. In addition, some embodiments of the invention are small enough to be placed on a moving object such as a vehicle or a person's helmet. In addition, embodiments of the invention can be used as unobtrusive surveillance sensors that can be placed so as to capture images of people from a normal point-of-view (as compared to the point-of-view of a surveillance camera mounted in a ceiling). These embodiments can be physically and unobtrusively placed on cash registers, shop shelves or other locations.

Other embodiments of the invention can be used with a video camera (either digital or analog) and/or a still digital or film camera. Further, some embodiments of the invention can be used with video or visual surveillance systems.

One skilled in the art will understand that embodiments of the invention can be used to capture light from a greater than 90° surrounding partial panoramic scene including a 360° surrounding panoramic scene.

From the foregoing, it will be appreciated that embodiments of the invention have (without limitation) the following advantages over the invention of FIG. 1:

1) It is simpler to make because the upper mirror is not positioned over a void.
2) It is color corrected.
3) It has an increased aperture.
4) The maximum clear aperture (largest required lens/ mirror diameter) of this type of system can be as small as about 2× the image diameter containing the chosen vertical field of view.

While certain exemplary embodiments have been described and shown in the accompanying drawings, it is to be understood that such embodiments are merely illustrative and not restrictive of the current invention, and that this invention is not restricted to the specific constructions and arrangements shown and described, since modifications may occur to those ordinarily skilled in the art.

TABLE 1

| SRF | RADIUS | THICKNESS | GLASS | Note |
|---|---|---|---|---|
| 2 | 15.390623 | 2.358848 | O_S-LAH58 | |
| 3 | — | 4.056893 | O_S-LAH58 | dummy surface |
| 4 | 13.481452 | −4.056893 | REFLECT | |
| 5 | −6.072127 | −5.822116 | O_S-FPL53 | |
| 6 | 309.080513 | 5.822116 | REFLECT | |
| 7 | −6.072127 | 4.056893 | O S-LAH58 | |
| 8 | 13.481452 | — | AIR | |
| 9 | 13.481452 | 0.500000 | O S-FPL51 | |
| 10 | 5.621376 | 1.267815 | O S-TIH11 | |
| 11 | −7.693857 | 0.043000 | AIR | |
| 12 | 1.964969 | 1.000000 | O_S-YGH51 | |
| 13 | −3.523882 | 0.390000 | O_S-NPH1 | |
| 14 | 2.625178 | 0.113989 | AIR | |
| AST | — | 1.760425 | AIR | Aperture Radius 0.628 |
| 16 | −0.986432 | 1.067350 | O_S-FPL51 | |
| 17 | −1.741826 | 1.524088 | AIR | |
| 18 | — | 1.000000 | BK7 | |
| 19 | — | 0.500000 | AIR | |
| 20 | — | — | AIR | *⅔" CCD |

TABLE 2

| SRF | RADIUS | THICKNESS | GLASS | NOTE |
|---|---|---|---|---|
| 2 | 18.200000 | 2.300000 | O_S-LAH58 | |
| 3 | — | 4.100000 | O_S-LAH58 | dummy surface |
| 4 | 13.029000 | −4.100000 | REFLECT | |
| 5 | −5.000000 | −4.280000 | O_S-FPL53 | |
| 6 | 421.000000 | 4.280000 | REFLECT | |
| 7 | −5.000000 | 4.100000 | O_S-LAH58 | |
| 8 | 13.029000 | — | AIR | |
| 9 | 13.029000 | 0.360000 | O_S-FPL51 | |
| 10 | 4.480000 | 1.760000 | O_S-TIH11 | |
| 11 | −6.900000 | 0.160000 | AIR | |
| 12 | 1.621941 | 0.740000 | O_S-YGH51 | |
| 13 | −3.160000 | 0.440000 | O_S-NPH1 | |
| 14 | 2.131000 | 0.071000 | AIR | |
| AST | — | 1.350000 | AIR | Aperture radius .475 |
| 16 | −0.804501 | 0.480000 | O_S-FPL51 | |
| 17 | −1.264000 | 1.087453 | AIR | |
| 18 | — | 1.000000 | BK7 | |
| 19 | — | 0.500000 | AIR | |
| 20 | — | — | AIR | ½" CCD |

TABLE 3

| SRF | RADIUS | THICKNESS | CLASS | NOTE |
|---|---|---|---|---|
| 2 | 19.374750 | 2.266620 | O_S-LAH58 | |
| 3 | — | 4.912728 | O_S-LAH58 | dummy surface |
| 4 | 12.808952 | −4.912728 | REFLECT | |
| 5 | −4.358388 | −3.580382 | ACRYL | |
| 6 | 299.451974 | 3.580382 | REFLECT | |
| 7 | −4.358388 | 4.912728 | O_S-LAH58 | |
| 8 | 12.808952 | 0.430101 | AIR | |
| 9 | 4.195110 | 0.750000 | STYRE | |
| 10 | −7.113288 | 0.441961 | AIR | |
| 11 | 1.557779 | 0.730000 | O_S-LAM60 | |
| 12 | −2.669135 | 0.280000 | O_S-TIH6 | |
| 13 | 2.298896 | 0.075351 | AIR | |
| AST | — | 1.314989 | AIR | Aperture radius 0.487 |
| 15 | −0.780919 | 0.652154 | ACRYL | |
| 16 | −1.414348 | 0.951240 | AIR | |
| 17 | — | 1.000000 | BK7 | |
| 18 | — | 0.500000 | AIR | |
| 19 | — | — | AIR | |
| 20 | — | — | AIR | ½" CCD |

TABLE 4

| SRF | RADIUS | THICKNESS | GLASS | NOTE |
|---|---|---|---|---|
| 2 | 16.088826 | 2.266620 | STYRE | |
| 3 | — | 4.912728 | STYRE | dummy surface |
| 4 | 13.817131 | −4.912728 | REFLECT | |
| 5 | −4.358388 | −3.580382 | ACRYL | |
| 6 | −19.606938 | 3.580382 | REFLECT | |
| 7 | −4.358388 | 4.912728 | STYRE | |
| 8 | 13.817131 | 0.629899 | AIR | |
| 9 | 5.115189 | 0.750000 | STYRE | |
| 10 | −7.710574 | 0.100000 | AIR | |
| 11 | 1.434568 | 0.734555 | O_S-LAM60 | |
| 12 | −3.101590 | 0.280000 | O_S-TIH6 | |
| 13 | 1.991805 | 0.075351 | AIR | |
| AST | — | 1.314989 | AIR | Aperture Radius 0.487 |
| 15 | −0.722183 | 1.295103 | ACRYL | |
| 16 | −1.841323 | 0.213029 | AIR | |
| 17 | — | 1.000000 | BK7 | |
| 18 | — | 0.500000 | AIR | |
| 19 | — | — | AIR | |
| 20 | — | — | AIR | ½" CCD |

What is claimed is:

1. A partial panoramic imaging arrangement comprising:
a first transparent component and
a second transparent component attached to said first transparent component at a refractive interface, said refractive interface, about an axis of revolution, and having a first curvature in a plane of said axis of revolution;
said first transparent component comprising:
a first refractive surface, about said axis of revolution, having a first profile with a second curvature in said plane of said axis of revolution;
a first reflective surface, about said axis of revolution, having a second profile with a third curvature in said plane of said axis of revolution, said first reflective surface having an inner radial boundary and an outer radial boundary; and
a third refractive surface, about said axis of revolution, having said third curvature, congruent with a portion of said second profile and extending to said inner radial boundary;
said second transparent component comprising a second reflective surface, about said axis of revolution, having a fourth profile with a fourth curvature in said plane of said axis of revolution;
whereby light, from a greater than 90° surrounding partial panoramic scene, is refracted at the first refractive surface as it enters the first transparent component, is reflected at said first reflective surface towards the refractive interface where the light is refracted into said second transparent component toward said second reflective surface that reflects the light back to the refractive interface where the light is refracted towards said third refractive surface where the light is refracted as it exits the first transparent component.

2. The partial panoramic imaging arrangement of claim 1 wherein said greater than 90° surrounding partial panoramic scene is substantially 360°.

3. The partial panoramic imaging arrangement of claim 2 wherein said greater than 90° surrounding partial panoramic scene said light exiting the first transparent component can be focused as a portion of an annular image.

4. The partial panoramic imaging arrangement of claim 1 wherein said first curvature has a convex radius of approximately 15 units, said second curvature has a convex radius of approximately 13 units, said third curvature has a concave radius of approximately 6 units, and said fourth curvature has a convex radius of approximately 309 units.

5. The partial panoramic imaging arrangement of claim 4 wherein the radius of said first curvature is approximately 15.4 millimeters.

6. The partial panoramic imaging arrangement of claim 1 further comprising:
a third transparent component in contact with said third refractive surface;
a fourth transparent component in contact with the third transparent component; and
a system of lenses in optical communication with the fourth transparent component.

7. The partial panoramic imaging arrangement of claim 6 wherein the transparent components and the system of lenses provide color correction to said light.

8. The partial panoramic imaging arrangement of claim 6 having a field-of-view of at least 30°.

9. The partial panoramic imaging arrangement of claim 8 wherein said field-of-view extends through a horizon line.

10. The partial panoramic imaging arrangement of claim 8 having a maximum clear aperture of less than about eight times the diameter of the image.

11. The partial panoramic imaging arrangement of claim 1 mounted on an image sensor device.

12. The partial panoramic imaging arrangement of claim 11, wherein said image sensor device is an integrated circuit.

13. The partial panoramic imaging arrangement of claim 11, wherein said image sensor device is a video camera.

14. The partial panoramic imaging arrangement of claim 11, wherein said image sensor device is part of a visual or video conferencing device.

15. The partial panoramic imaging arrangement of claim 11, wherein said image sensor device is a digital camera.

16. The partial panoramic imaging arrangement of claim 11, wherein said image sensor device is attached to a moving object.

17. The partial panoramic imaging arrangement of claim 16, wherein the moving object is a helmet.

18. The partial panoramic imaging arrangement of claim 16, wherein the moving object is a vehicle.

19. The partial panoramic imaging arrangement of claim 11, wherein said image sensor device is incorporated with an object for which surveillance is desired.

20. A partial panoramic imaging arrangement comprising:
a first transparent component about an axis of revolution, the first transparent component having an upper surface and a lower surface; said lower surface including a first reflective portion and a refractive portion both said portions about said axis of revolution, said refractive portion radially inward from said first reflective portion, wherein light from a greater than 90° surrounding partial panoramic scene, is refracted by a portion of said upper surface; and
a second transparent component attached to said first transparent component at a refractive interface, said refractive interface, about said axis of revolution and extending into said upper surface, the second transparent component also having a distal reflective surface.

21. The partial panoramic imaging arrangement of claim 20 wherein said greater than 90° surrounding partial panoramic scene is substantially 360°.

22. The partial panoramic imaging arrangement of claim 21 wherein said greater than 90° surrounding partial panoramic scene said light exiting the first transparent component can be focused as an annular image.

23. The partial panoramic imaging arrangement of claim 21 having a maximum clear aperture of less than about eight times the diameter of the image.

24. The partial panoramic imaging arrangement of claim 20 further comprising:
   a third transparent component in contact with said refractive portion;
   a fourth transparent component in contact with the third transparent component; and
   a system of lenses in optical communication with the fourth transparent component.

25. The partial panoramic imaging arrangement of claim 24 wherein the transparent components and the system of lenses provide color correction to said light.

26. The partial panoramic imaging arrangement of claim 24 having a field-of-view of at least 30°.

27. The partial panoramic imaging arrangement of claim 26 wherein said field-of-view extends through an horizon line.

28. The partial panoramic imaging arrangement of claim 20 further comprising:
   a third transparent component in optical communication with said refractive portion; and
   a system of lenses in optical communication with the third transparent component.

29. The partial panoramic imaging arrangement of claim 28 wherein the transparent components and the system of lenses provide color correction to said light.

30. The partial panoramic imaging arrangement of claim 28 having a field-of-view of at least 30°.

31. The partial panoramic imaging arrangement of claim 30 wherein said field-of-view extends through an horizon line.

32. The partial panoramic imaging arrangement of claim 20 mounted on an image sensor device.

33. The partial panoramic imaging arrangement of claim 32, wherein said image sensor device is an integrated circuit.

34. The partial panoramic imaging arrangement of claim 32, wherein said image sensor device is a video camera.

35. The partial panoramic imaging arrangement of claim 32, wherein said image sensor device is part of a visual or video conferencing device.

36. The partial panoramic imaging arrangement of claim 32, wherein said image sensor device is a digital camera.

37. The partial panoramic imaging arrangement of claim 32, wherein said image sensor device is attached to a moving object.

38. The partial panoramic imaging arrangement of claim 37, wherein the moving object is a helmet.

39. The partial panoramic imaging arrangement of claim 37, wherein the moving object is a vehicle.

40. The partial panoramic imaging arrangement of claim 32, wherein said image sensor device is incorporated with an object for which surveillance is desired.

* * * * *